United States Patent [19]
Holt

[11] Patent Number: 5,339,866
[45] Date of Patent: Aug. 23, 1994

[54] MULTIPLE HOSE ASSEMBLY
[75] Inventor: Earl R. Holt, Rochester Hills, Mich.
[73] Assignee: Hose Specialties/Capri, Inc., Highland Park, Mich.
[21] Appl. No.: 117,631
[22] Filed: Sep. 7, 1993

Related U.S. Application Data
[63] Continuation of Ser. No. 780,878, Oct. 18, 1991, abandoned.

[51] Int. Cl.5 ............................................. F16L 9/18
[52] U.S. Cl. ................................. 138/111; 138/106; 901/43
[58] Field of Search ............ 138/106, 111, 115, 116; 248/68.1; 285/137.1, 188; 414/918; 901/43

[56] References Cited

U.S. PATENT DOCUMENTS

| | | | |
|---|---|---|---|
| 2,916,055 | 12/1959 | Brumbach | 138/111 |
| 3,027,419 | 3/1962 | Owen | 248/68.1 |
| 3,086,369 | 4/1963 | Brown | 138/111 |
| 3,907,002 | 9/1975 | Gulich | 138/115 |
| 4,162,865 | 7/1979 | Aubet | 138/111 |
| 4,378,923 | 4/1983 | Takei | 248/68.1 |
| 4,741,593 | 5/1988 | Fochler | 138/111 |
| 4,899,965 | 2/1990 | Usui | 138/106 |
| 4,905,943 | 3/1990 | Sugiyama | 138/106 |
| 5,036,891 | 8/1991 | Vogelsang | 285/188 |
| 5,072,902 | 12/1991 | Washizu | 138/106 |

FOREIGN PATENT DOCUMENTS

| | | | |
|---|---|---|---|
| 3625127 | 12/1987 | Fed. Rep. of Germany | 285/137.1 |
| 703131 | 1/1954 | United Kingdom | 138/111 |

Primary Examiner—Timothy F. Simone
Assistant Examiner—Terrence R. Till
Attorney, Agent, or Firm—Harness, Dickey & Pierce

[57] ABSTRACT

A multiple hose assembly including a plurality of hose portions which are disposed in a first direction in a substantially parallel and a substantially planar arrangement. In addition, the multiple hose assembly further includes a plurality of support members for securing the hose portions in the substantially parallel and the substantially planar arrangement. The support members used for securing the hose portions are disposed in a second direction which is different from the first direction.

9 Claims, 1 Drawing Sheet

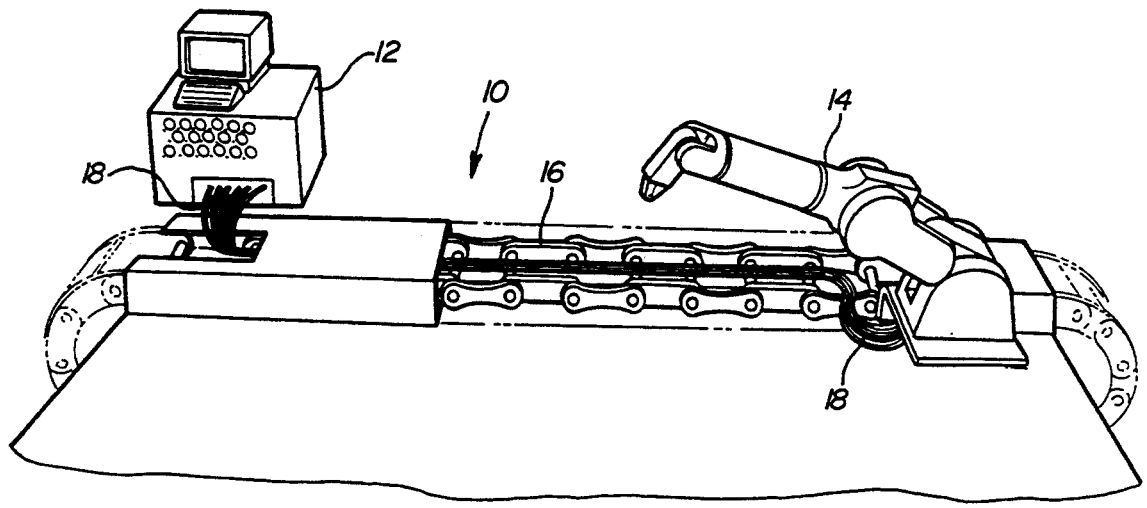
Fig-1
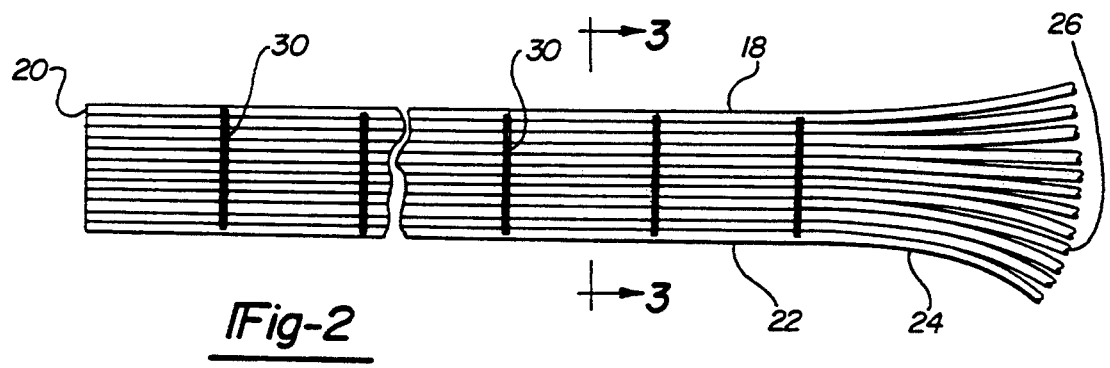
Fig-2
Fig-3
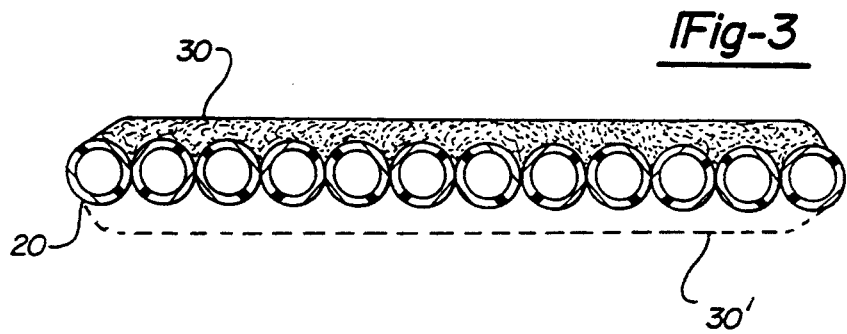

MULTIPLE HOSE ASSEMBLY

This is a continuation of U.S. patent application Ser. No. 07/780,878, filed Oct. 18, 1991, now abandoned.

BACKGROUND OF THE INVENTION

1. Field of the Invention

This invention relates to hose assemblies and methods for arranging hoses and, in particular, concerns a multiple hose assembly which is flexed during usage.

2. Description of Related Art

Vehicle painting operations often involve the application of several different colors of paint to automobile components. Painting operations of this type may use a moveable robot which travels proximate to the surface of an automobile component at some point along an assembly line. Such a robot generally requires a continuous access to multiple reservoirs containing the different types of paint. To provide this access, a relatively large number of hoses are used to carry paint from these reservoirs to the robot. In addition, because the application of paint often requires that the paint be sprayed by a pressurized air system or an electronic system, multiple air hoses are also often connected to the robot. These hoses are generally bundled together with ties to form a single relatively rigid bundle assembly.

The difficulties associated with using such a bundled hose assembly relates to the resistance that such bundle assemblies have to the bending which occurs during movement of the robot. More specifically, the frictional forces which are generated due to each hose being in close contact with several other hoses, as well as the columnar effect such hoses generate, tend to increase the amount of effort required to move the robot. The problem which this generates in many industrial applications, including automobile painting operations, is that it is often necessary that the bundle assembly be capable of bending 180° or more over a short distance to accommodate a robot's movement without providing significant resistance which might otherwise cause a deflection from the robot's intended path of travel or sweep of movement.

Another shortcoming associated with a relatively rigid bundle assembly involves the inconvenience associated with identifying a broken or ruptured hose within the bundle, and the subsequent substitution of a spare hose to replace the broken or ruptured hose. In typical painting operations, a certain number of spare hoses are maintained for substitution in the event of a breakage or rupture of a hose. However, it is often difficult to locate both ends of one particular broken hose due to the twisting of the hoses which may have resulted from repeated movement of the bundle during painting.

Previous efforts to reduce these shortcomings through alternate hose assembly arrangements were generally not satisfactory. The bonding of several hoses along their lengths using a cement material provided undesirable results due to the tendency of the bonds to split when the hoses were bent. Securing several hoses together in the same relationship by use of a heat knife to melt and subsequently bond an exterior portion of each hose also did not provide satisfactory results. In addition, the relatively large amount of labor required and the absence of effective equipment to accomplish these two types of bonding with accuracy and speed also made these methods undesirable.

The need therefore exists for an improved multiple hose assembly which is capable of being easily bent to the degree necessary for accommodating robotic movement yet is structurally sound. A need also exists for a multiple hose assembly which provides for an easy method for locating breaks or ruptures along the hoses and which allows for quick and easy substitution of a spare hose in such an event.

SUMMARY OF THE INVENTION

In accordance with the teaching of the preferred embodiment of the present invention, a multiple hose assembly is provided. The multiple hose assembly comprises a plurality of flexible hoses in a substantially parallel and a substantially planar arrangement, and means for securing the plurality of hoses in such an arrangement and in axial contact. The method for forming the multiple hose assembly involves aligning a series of hoses in a substantially parallel and a substantially planar arrangement, and securing the hoses in such an arrangement by melting a plurality of support members across one or both planar surfaces established by the hoses. The multiple hose assembly formed by this method achieves a relatively flexible yet structurally sound arrangement of multiple hoses for use with robotic, electrostatic or mechanical painting equipment. In addition, such an arrangement of hoses allows for easy and quick identification and substitution of broken or ruptured hoses. Finally, the multiple hose assembly of the present invention reduces the stresses on the hoses which results in increased duration of service.

BRIEF DESCRIPTION OF THE DRAWINGS

The various advantages of the present invention will become apparent to one skilled in the art after reading the following specification and by reference to the drawings in which:

FIG. 1 is a perspective view illustrating the positional relationship of a multiple hose assembly with respect to computer control system and a painting robot according to the teachings of the preferred embodiment of the present invention;

FIG. 2 is a top view of the multiple hose assembly taken from a perspective orthogonal to the plane of the hoses according to the teachings of the preferred embodiment of the present invention;

FIG. 3 is a cross-sectional view of the multiple hose assembly taken along the line 3—3 of FIG. 2.

DETAILED DESCRIPTION OF THE PREFERRED EMBODIMENT

It should be understood from the outset that while this invention is described in connection with a particular example, the scope of the invention need not be so limited to those skilled in the art that its teachings can be used in a much wider variety of industrial applications than the examples specifically mentioned herein.

FIG. 1 shows a perspective view illustrating an automotive painting apparatus generally designated by the numeral 10. The painting apparatus 10 includes a computer control system 12 and a robot 14. The computer control system 12 and the robot 14 are used to apply paint to an automobile component traveling along an automobile assembly line (not shown). During such a painting operation, the robot 14 is moved along proximate to the surface of the automobile component by a transport means such as the CatTrac apparatus 16 shown in FIG. 1. It will be appreciated by those skilled in the art that the painting apparatus 10 is merely descriptive of one particular type of apparatus for which the present invention may be used. It will also be appreciated that the present invention may be used in a wide variety of other applications with different types of equipment. In particular, it is understood that the robot 14 need not necessarily be used for applying paint to an automobile component, and the structure of the robot 14 may be different from that which is described herein.

To deliver paint and air to the robot 14, a multiple hose assembly 18 is provided. The multiple hose assembly 18 is connected between the computer control system 12 and the robot 14 and supplies pressurized air and paint to the robot 14 from reservoirs associated with, and controlled by, the computer control system 12. In the preferred embodiment illustrated in FIG. 2, the multiple hose assembly 18 contains twelve nylon hoses 20, aligned in a first direction, and at least a portion of which are disposed in a substantially parallel and a substantially planar fashion with respect to each other. This substantially parallel and substantially planar arrangement of the hoses 20 define the upper and lower surfaces of the multiple hose assembly 18. The hoses 20 may be those which are available from Hose Specialties Company/Capri, Inc., though other suitable hoses may be used. In addition, it is understood that the hoses may be made from nylon, polyethylene, teflon, or other material depending on the particular need.

To secure the hoses 20 in a manner such that at least a portion of the hoses are disposed in a substantially parallel and a substantially planar arrangement, a plurality of support members 30 are provided. The support members 30 extend across the upper surface of the plane established by the hoses 20 but does not extend beyond the width of the multiple hose assembly. In addition, support members 30 are oriented in a second direction which is substantially perpendicular to the first direction established by the hoses 20 and are disposed at regular intervals along the lengths of the hoses 20. The support members 30 are secured to the hoses 20 by first placing the support members 30 substantially perpendicular to the hoses 20 and then heating the support members 30 to a sufficient degree so as to cause a bond to be created between the support members 30 and the hoses 20. Preferably, each of the support members 30 is sufficiently heated to form a continuous bond across the upper exterior surface of each of the hoses 20. While the support members 30 may be made from nylon, other suitable materials may be used so long as the material chosen is able to bind to the surfaces of the hoses 20. In addition, other methods may be used for securing the support members 30 to the hoses 20 such as adhesive.

The various lengths of hoses as well as the number of hoses which are to be used in any one particular embodiment will depend upon the specific installation for which the multiple hose assembly 18 is used. For example, the support members 30 may be located at six-inch intervals along a 19-foot section of the multiple hose assembly 18 thereby creating a secured region 22. The secured region 22 may be located along the 30-foot section of the multiple hose assembly 18 so as to leave a first whip end region 24 of a length of approximately seven feet and a second whip end region (not shown) of a length of approximately four feet at the opposite end of the multiple hose assembly 18. As shown in FIG. 2, the first whip end region 24 and second whip end region are similarly comprised of a plurality of hose end lengths 26 which are free of support members 30 for ease in connection to both the computer control system 12 and the robot 14.

It will also be noted that increased support near the whip end region 24 of the multiple hose assembly 18 can be achieved by securing a plurality of the support members 30 at a single location near the ends of the secured region 22 of the multiple hose assembly 18, and also by locating several additional support members 30' (shown in phantom) on both sides of the multiple hose assembly 18 near the end of the secured region 22. In addition, the multiple hose assembly 18 can be located on top of another multiple hose assembly 18 so as to increase the number of hoses leading from the computer control system 12 to the robot 14 yet still maintaining a relatively high degree of flexibility.

The present invention overcomes several problems encountered by the prior art. The planar orientation of the multiple hose assembly 18 allows for increased flexibility which is desirable in certain environments such as that which accompanies movement of a robot when painting an automobile component. At the same time, the flat orientation of the multiple hose assembly 18 make the identification of breaks or ruptures quick and easy so that substitutions with spare hoses within the assembly can be made without unduly delaying the painting process. Further, numbering of the hoses within the multiple hose assembly 18 allows for ready identification of both ends of a substitute hose for quick replacement following a breakage or rupture of a hose. The multiple hose assembly 18 is also structurally sound, as there is relatively little tendency for the support members 30 to become detached from the hoses.

While the above description discusses a preferred embodiment of the present invention, it will be understood that the description is exemplary in nature and is not intended to limit the scope of the invention. For example, the multiple hose assembly may be used in other types of applications where a plurality of hoses are employed. The present invention will therefore be understood as susceptible to modification, alteration and variation by those skilled in the art without deviating from the scope and meaning of the following claims.

What is claimed is:

1. A multiple hose assembly of the type adapted for delivery of a plurality of separated fluids, the assembly comprising:

a plurality of flexible hose members disposed in a substantially parallel and a substantially planar arrangement, adjacent hose members being in axial contact with each other at an axial contact point, each of said plurality of flexible hose members having an exterior surface on a first side of a line extending through said axial contact points, and said hose members being disposed in a first direction; and means for securing said plurality of flexible hose members in a substantially parallel and axially adjacent arrangement, said means for securing said plurality of flexible hose members forming a continuous bond across said exterior surface of each of said plurality of flexible hose members, said bond extending substantially adjacent to each of said axial contact points and being further adapted to retain said plurality of flexible hose members in a substantially planar arrangement in close proximity thereto.

2. The multiple hose assembly of claim 1, wherein said means for securing said plurality of hose members comprises a plurality of support members disposed on said upper exterior surfaces of said plurality of hose members.

3. The multiple hose assembly of claim 2, wherein said support members are disposed substantially perpendicular to said first direction.

4. The multiple hose assembly of claim 2, wherein said support members are positioned at substantially uniform intervals along said multiple hose assembly.

5. The multiple hose assembly of claim 2, wherein each of said support members is nylon.

6. A multiple hose assembly of the type adapted for delivery of a plurality of separated fluids, the assembly comprising:
 a plurality of flexible hose members disposed in a substantially parallel and a substantially planar arrangement, adjacent hose members being in axial contact at an axial contact point along a line passing through each of said plurality of hose members, each of said plurality of flexible hose members having 1an arcuate exterior surface on a first side of said line, each of said plurality of hose members further being disposed in a first direction, said arcuate exterior surfaces collectively defining a first surface of said assembly having a width perpendicular to said first direction; and
 a plurality of support members, each of said support members forming a continuous bond across said upper surface of said assembly and having a length no greater than said width of said assembly, each of said plurality of support members extending substantially adjacent to each of said axial contact points, thereby rigidifying said assembly and substantially retaining said flexible hose members in a substantially parallel and axially adjacent arrangement, said support members further adapted to retain said plurality of hose members in a substantially planar arrangement in close proximity to each of said support members.

7. The multiple hose assembly of claim 6, wherein each of said plurality of support members is disposed substantially perpendicular with respect to said first direction.

8. The multiple hose assembly of claim 6, wherein said support members are positioned at substantially uniform intervals along said multiple hose assembly.

9. The multiple hose assembly of claim 6, wherein each of said support members is nylon.

* * * * *